(12) United States Patent
Zhou

(10) Patent No.: US 6,709,539 B2
(45) Date of Patent: Mar. 23, 2004

(54) ONE-PART MOISTURE CURABLE POLYURETHANE ADHESIVE

(75) Inventor: Lirong Zhou, Troy, MI (US)

(73) Assignee: Dow Global Technologies Inc., Midland, MI (US)

( * ) Notice: Subject to any disclaimer, the term of this patent is extended or adjusted under 35 U.S.C. 154(b) by 173 days.

(21) Appl. No.: 09/928,980

(22) Filed: Aug. 7, 2001

(65) Prior Publication Data

US 2002/0061962 A1 May 23, 2002

Related U.S. Application Data

(60) Provisional application No. 60/223,135, filed on Aug. 7, 2000.

(51) Int. Cl.$^7$ .............................. C09J 175/04; E06B 3/56
(52) U.S. Cl. .................... 156/108; 156/331.4; 524/445; 524/590; 524/507; 525/92 C; 525/130; 525/131; 525/452; 525/458; 528/60; 528/77; 528/81
(58) Field of Search .............................. 525/131, 452, 525/458, 92 C, 130; 528/60, 77, 81; 524/445, 590, 507; 156/108, 331.4

(56) References Cited

U.S. PATENT DOCUMENTS

| | | | |
|---|---|---|---|
| 3,325,421 A | 6/1967 | Muller | 252/308 |
| 3,502,704 A | 3/1970 | McKellar | 260/448.8 |
| 3,627,722 A | 12/1971 | Selter | 260/37 |
| 3,707,521 A | 12/1972 | Santis | 260/37 N |
| 3,743,626 A | 7/1973 | Emmons | 260/77.5 |
| 3,779,794 A | 12/1973 | DeSantis | 117/72 |
| 3,886,226 A | 5/1975 | Asai et al. | 260/77.5 |
| 4,002,601 A | 1/1977 | Hajek et al. | 260/77.5 |
| 4,093,569 A | 6/1978 | Reischl et al. | 260/2.5 |
| 4,118,376 A | 10/1978 | Pedain et al. | 528/59 |
| 4,148,840 A | 4/1979 | Shah | 260/859 |
| 4,192,937 A | 3/1980 | Noll et al. | 528/59 |
| 4,193,832 A | 3/1980 | Reischl et al. | 156/331 |
| 4,284,751 A | 8/1981 | Hutt et al. | 528/45 |
| 4,345,053 A | 8/1982 | Rizk et al. | 525/440 |
| 4,357,430 A | 11/1982 | VanCleve | 521/128 |
| 4,373,082 A | 2/1983 | Kimball et al. | 528/60 |
| 4,374,237 A | 2/1983 | Berger et al. | 528/28 |
| 4,390,645 A | 6/1983 | Hoffman et al. | 521/137 |
| 4,396,681 A | 8/1983 | Rizk et al. | 428/423.1 |
| 4,400,497 A | 8/1983 | Blum et al. | 528/45 |
| 4,419,513 A | 12/1983 | Breidenbach et al. | 544/222 |
| 4,483,974 A | 11/1984 | Grögler et al. | 528/68 |
| 4,496,706 A | 1/1985 | Chang | 528/57 |
| 4,511,626 A | 4/1985 | Schumacher | 428/425.6 |
| 4,525,511 A | 6/1985 | Kirby et al. | 524/158 |
| 4,539,345 A | 9/1985 | Hansen | 523/219 |
| 4,549,005 A | 10/1985 | Goel | 528/53 |
| 4,555,561 A | 11/1985 | Sugimori | 528/26 |
| 4,595,445 A | 6/1986 | Hombach et al. | 156/307.3 |
| 4,625,012 A | 11/1986 | Rizk et al. | 528/28 |
| 4,626,474 A | 12/1986 | Kim | 428/416 |
| 4,626,475 A | 12/1986 | Goel et al. | 428/423.1 |
| 4,640,969 A | 2/1987 | Goel et al. | 528/73 |
| 4,643,794 A | 2/1987 | Saracsan et al. | 156/310 |
| 4,667,008 A | 5/1987 | Grögler et al. | 528/67 |
| 4,681,926 A | 7/1987 | Goel | 528/48 |
| 4,687,533 A | 8/1987 | Rizk et al. | 156/307.3 |
| 4,695,596 A | 9/1987 | Berkowitz | 521/137 |
| 4,710,560 A | 12/1987 | Vu | 528/67 |
| 4,720,536 A | 1/1988 | House et al. | 528/60 |

(List continued on next page.)

FOREIGN PATENT DOCUMENTS

| | | |
|---|---|---|
| WO | 94/18255 | 8/1994 |
| WO | 00/46320 | 8/2000 |

OTHER PUBLICATIONS

Derwent AN # 0039233; Dec. 20, 1972; Kenneth E. Coulter et al.
Dover Chemical Corp., Doverphos 675, 12 and 7, pp. 2–4, (no date available).
Witco, Properties and Applicatons of Fomrez/Eurecat Catalysts, p. 5, (no date available).
Derwent AN 1993–152954; CA 2049695A, Feb. 1993.
Derwent AN#1992–350494; DE 4111654A, Oct. 1992.
Derwent AN#1988–095016; JP 63045242A, Feb. 1988.
Derwent AN#1998–316780; JP 63–046212, Feb. 1988.
Derwent AN#1988–333427; JP63245485A Oct. 1988.
Derwent AN#1978–34965A; GB1575666A Sep. 1980.
Derwent AN 92–065839/09; DE 4025776–A,Feb. 1992.

*Primary Examiner*—Patricia A. Short
(74) *Attorney, Agent, or Firm*—Norman L Sims

(57) ABSTRACT

The present invention is a polyurethane prepolymer comprising the reaction product of:
A) a polyisocyanate;
B) one or more compounds or polymers having isocyanate-reactive moieties.
C) a dispersion triol containing from about 10 to about 60 percent by weight based on the dispersion of particles of an organic polymer which is nonreactive with the polyols and polyisocyanates having a particle size of from about 5 to about 50 microns;

wherein the prepolymer has a free isocyanate content of from about 0.8 to about 2.2 percent, the weight ratio of diol to triol and dispersion triol is from about 0.8 to about 1.2. In another embodiment the invention is a one-part adhesive composition comprising the polyurethane prepolymer of the invention and a catalyst capable of catalyzing the reaction of isocyanate moieties with water. In another embodiment the invention is a process for bonding two substrates together which comprises contacting the adhesive composition of the invention with at least one of the substrates and contacting the substrates together along the portion of the substrate(s) to which the adhesive has been applied before the adhesive applied cures and allowing the adhesive to cure and bond the substrates together.

20 Claims, No Drawings

U.S. PATENT DOCUMENTS

| | | | |
|---|---|---|---|
| 4,728,710 A | 3/1988 | Goel | 528/58 |
| 4,745,137 A | 5/1988 | Thomas et al. | 525/458 |
| 4,758,648 A | 7/1988 | Rizk et al. | 528/53 |
| 4,778,845 A | 10/1988 | Tschan et al. | 524/710 |
| 4,780,520 A | 10/1988 | Rizk et al. | 528/53 |
| 4,782,127 A | 11/1988 | van Nuffel | 526/329.2 |
| 4,835,012 A | 5/1989 | Saur | 427/266 |
| 4,879,853 A | 11/1989 | Braendle et al. | 524/779 |
| 4,950,715 A | 8/1990 | Duck et al. | 525/127 |
| 4,985,491 A | 1/1991 | Reisch | 524/875 |
| 5,015,321 A | 5/1991 | Jansen et al. | 156/331.7 |
| 5,018,337 A | 5/1991 | Carter et al. | 53/458 |
| 5,063,269 A | 11/1991 | Hung | 524/296 |
| 5,082,736 A | 1/1992 | Bravet et al. | 428/425.6 |
| 5,086,151 A | 2/1992 | Ito et al. | 528/53 |
| 5,102,969 A | 4/1992 | Scheffler et al. | 528/48 |
| 5,110,892 A | 5/1992 | Graham | 528/48 |
| 5,126,421 A | 6/1992 | Majewski et al. | 528/44 |
| 5,143,987 A | 9/1992 | Hansel et al. | 525/458 |
| 5,143,995 A | 9/1992 | Meckel et al. | 528/59 |
| 5,194,488 A | 3/1993 | Piestert et al. | 524/703 |
| 5,206,200 A | 4/1993 | Bush et al. | 502/167 |
| 5,242,984 A | 9/1993 | Dillman et al. | 525/314 |
| 5,272,204 A | 12/1993 | Akimoto et al. | 524/700 |
| 5,279,882 A | 1/1994 | Daude et al. | 428/192 |
| 5,288,839 A | 2/1994 | Greco | 528/204 |
| 5,290,853 A | 3/1994 | Regan | 524/779 |
| 5,302,303 A | 4/1994 | Clatty et al. | 252/6.5 |
| 5,342,867 A | 8/1994 | Ryan et al. | 524/101 |
| 5,391,416 A | 2/1995 | Kunert | 428/122 |
| 5,409,961 A | 4/1995 | Green | 521/78 |
| 5,473,043 A | 12/1995 | Maki et al. | 528/60 |
| 5,488,085 A | 1/1996 | Hayes et al. | 525/53 |
| 5,489,618 A | 2/1996 | Gerkin | 521/128 |
| 5,603,798 A | 2/1997 | Bhat | 156/331.4 |
| 5,623,044 A | 4/1997 | Chiao | 528/28 |
| 5,672,652 A | 9/1997 | Bhat | 524/590 |
| 5,747,581 A | 5/1998 | Proebster et al. | 524/590 |
| 5,852,137 A | 12/1998 | Hsieh et al. | 525/458 |
| 5,922,809 A | 7/1999 | Bhat et al. | 525/131 |
| 5,976,305 A | 11/1999 | Bhat et al. | 156/331.4 |

ONE-PART MOISTURE CURABLE POLYURETHANE ADHESIVE

CROSS-REFERENCE TO RELATED APPLICATION

This application is a Rule 53(b) application of copending provisional application Ser. No. 60/223,135, filed Aug. 7, 2000.

BACKGROUND OF THE INVENTION

This application relates to a one-part polyurethane based adhesive useful in bonding porous and nonporous materials. The adhesive is especially useful in bonding glass into window frames, for example windshields and other window glass into automobiles.

Polyurethane adhesive compositions typically comprise at least one urethane prepolymer. Adhesives useful for bonding to nonporous substrates, such as glass, to metal, are well-known. When glass is installed in automobiles on a production line, a one-part moisture curable polyurethane adhesive is preferably used, as the equipment needed for the application of such an adhesive in an automobile assembly plant is less expensive than the equipment needed to apply a two-part adhesive. One part polyurethane adhesives are disclosed in U.S. Pat. Nos. 4,374,237 and 4,687,533 incorporated herein by reference.

U.S. Pat. No. 5,922,809 discloses a one-part polyurethane adhesive comprising a prepolymer comprising the reaction product of A) one or more polyisocyanates; B) one or more compounds containing an average of more than one isocyanate reactive moieties; preferably a mixture of a polyether diol and a polyether triol; and C) a dispersion triol containing from about 10 to about 60 percent by weight based on the dispersion of particles of an organic polymer having a particle size of from about 5 to about 50 microns, preferably comprising a polymer derived from styrene, halo or alkyl styrene; or a rubber modified polymer derived from styrene, or halo or alkyl substituted styrene; wherein the prepolymer has an isocyanate content of from about 0.8 to about 2.2 percent by weight; and D) a catalyst for the reaction of a polyisocyanate with water, incorporated herein by reference.

In the automotive after-market replacement industry, glass is often bound into automobiles through the use of two-part moisture curable polyurethane adhesives. Two-part polyurethane adhesives are used because they offer rapid initial cure allowing for rapid drive-away times. Two-part adhesives require special applicators which mix the two parts in specific proportions immediately prior to application. These applicators are more difficult to and costly to use than applicators used for one-part adhesives. Further, the improper application or mixing of two-part adhesives can result in poor adhesion. Two-part polyurethane adhesives are well known, see U.S. Pat. Nos. 4,835,012, and 5,603,798, both incorporated herein by reference, and DE 4,210,277.

The market demands simpler application systems and faster curing adhesives which allow even faster drive-away times. If the adhesive cures too rapidly, then the window installer loses the necessary time to install and properly place the glass into the frame before the adhesive becomes too intractable to work with. Working time is defined as the period from application of adhesive until the adhesive becomes too intractable to work with.

Regulations in the U.S. require dual airbags for the front seat of vehicles. During crashes the airbags inflate and exert additional pressure on the windshield. Federal Transportation Agency regulations require that windshield remain in place at crashes of up to 30 mph (48 KPH). This requires adhesives which have enhanced strength at the drive-away time. To meet such a standard, the lap shear strengths of the adhesive should be preferably 150 psi (1033 kPa) or greater as determined according to ASTM D-3163 and demonstrate impact energy strength of 9 ft-lbs (12.2 Joules) or greater at 23° C./50% RH.

There is a need for a one-part adhesive which can survive such a crash two hours after application of the adhesive at 15° F. (−9.4° C.). Survive a crash means that the windshield remains bonded in the automobile during and after the crash.

SUMMARY OF THE INVENTION

The present invention is a polyurethane prepolymer comprising the reaction product of A) one or more polyisocyanates;

B) one or more diols and one or more triols;

C) one or more dispersion triols containing from about 10 to about 60 percent by weight based on the dispersion of particles of an organic polymer having a particle size of from about 5 to about 50 microns;

wherein the prepolymer has a free isocyanate content of from about 0.8 to about 2.2 percent and the weight ratio of diol to triol and dispersion triol is from about 0.8 to about 1.2. The free isocyanate content referred to here is measured 24 hours after prepolymer production.

In another embodiment the invention is a one-part adhesive composition comprising the polyurethane prepolymer of the invention and a catalyst capable of catalyzing the reaction of isocyanate moieties with water.

In another embodiment the invention is a process for bonding two substrates together which comprises contacting the two substrates together with the adhesive composition of the invention disposed between the two substrates and allowing the adhesive to cure and bond the substrates together.

The adhesive of this invention is capable of bonding primed glass into an automobile such that glass will not delaminate from the window frame in a crash at 35 mph at 35° F. (1.7° C.) and 45 percent relative humidity 2.5 hours after adhesive application and at 30 mph at 15° F. (−9.4° C.) two hours after adhesive application. The adhesive of the invention also provides reasonable working times, preferably about 6 to about 15 minutes, and more preferably about 8 to about 10 minutes. Additionally, many of the problems associated with two-part adhesives described before are eliminated.

DETAILED DESCRIPTION OF THE INVENTION

The urethane prepolymers have an average isocyanate functionality sufficient to allow the preparation of a crosslinked polyurethane upon cure and not so high that the polymers are unstable. Stability in this context means that the prepolymer or adhesive prepared from the prepolymer has a shelf life of at least 6 months at ambient temperatures, in that it does not demonstrate an increase in viscosity during such period which prevents its application or use. Preferably the prepolymer or adhesive prepared therefrom does not undergo an increase in viscosity of more than about 50 percent during the stated period. Preferably, the average isocyanate functionality is at least about 2.2 and preferably at least about 2.4. Below about 2.2 the ability of the prepolymer to crosslink sufficiently to achieve the desired strength of the cured adhesive is compromised. Preferably the average isocyanate functionality of the prepolymer is 3.0 or less and more preferably 2.8 or less. Above 3.0 average isocyanate functionality the prepolymer and adhesives prepared from the prepolymer may exhibit unacceptable stability. The prepolymer preferably has a free isocyanate content which facilitates acceptable strength in adhesives prepared from the prepolymers after 60 minutes and stability of the prepolymer. Preferably, the free isocyanate content is about 0.8 percent by weight or greater based on the weight of the prepolymer and more preferably about 0.9 percent by weight or greater, and preferably about 2.2 percent by weight or less, more preferably about 2.0 or less, even more preferably about 1.4 percent by weight or less and even more preferably about 1.1 percent by weight or less and most preferably about 1.0 percent by weight or less. Above about 2.2 percent by weight the adhesives prepared from the prepolymer may demonstrate lap shear strengths after 60 minutes which are too low for the intended use and foaming during cure of the adhesive prepared from the prepolymer may occur. Below about 0.8 percent by weight the prepolymer viscosity is too high to handle and the working time is too short.

The free isocyanate content changes with time as the free isocyanate groups react with moisture. Primary free isocyanate content means the isocyanate content measured within a short period of time, less than 1 hour, after production of the prepolymer. Secondary free isocyanate content means the weight percent of isocyanate groups present in the prepolymer about 24 hours after production of the prepolymer. The preferred isocyanate contents referred to above are secondary isocyanate contents.

The prepolymer preferably exhibits a viscosity which facilitates formulation of a pumpable adhesive which has good green strength. Preferably the viscosity of the prepolymer is about 100,000 centipoise (1000.49 cm$^2$/s) or less and more preferably about 70,000 centipoise (700.31 (m$^2$/s)) or less, preferably about 30,000 centipoise (300.14 cm$^2$/s) or greater, and more preferably about 45,000 centipoise (450.20 cm$^2$/s) or greater. The viscosity used herein is Brookfield viscosity determined using a number 5 spindle. The viscosity of the adhesive can be adjusted with fillers, although the fillers cannot improve the green strength of the final adhesive. Below about 30,000 centipoise (300.14 cm$^2$/s) the adhesive prepared from the prepolymer may exhibit poor green strength. Above about 100,000 (100.49 cm$^2$/s) the prepolymer may be unstable and hard to dispense. The prepolymer may be prepared by any suitable method, such as by reacting the diol, triol and dispersion triol with an excess over stoichiometry of one or more polyisocyanates under reaction conditions sufficient to form a prepolymer having isocyanate functionality and free isocyanate content which meets the criteria discussed above.

Preferable polyisocyanates for use in preparing the prepolymer include those disclosed in U.S. Pat. No. 5,922,809 at column 3, line 32 to column 4, line 24 incorporated herein by reference. Preferably the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate.

The polyisocyanates are used in a sufficient amount to form an advanced polyurethane prepolymer having free reactive isocyanate moieties. Free reactive isocyanate moieties mean there are isocyanate groups bound to the prepolymer backbone which are free to react with reactive hydrogen atoms. Preferably the amount of polyisocyanate is about 5 percent by weight or greater based on the starting materials and more preferably about 9 percent by weight or greater and preferably about 20 percent by weight or less, more preferably about 15 percent by weight or less and even more preferably 11 percent by weight or less.

To prepare the prepolymer the polyisocyanates are reacted with one or more diols, one or more triols and a dispersion triol. The diol and triol are generically referred to as polyols. Polyols useful in this invention are diols and triols corresponding to the polyols described in U.S. Pat. No. 5,922,809 at column 4, line 60 to column 5, line 50, incorporated herein by reference.

Preferably, the polyol(s) have an average functionality of at least about 1.5, more preferably at least about 1.8 and most preferably at least about 2.0; and is preferably no greater than about 4.0, more preferably no greater than about 3.5 and most preferably no greater than about 3.0. Preferably, the equivalent weight of the polyol(s) is at least about 200, more preferably at least about 500 and more preferably at least about 1,000; and is preferably no greater than about 3,500, more preferably no greater than about 3,000 and most preferably no greater than about 2,500.

Preferably the polyols (diols and triols) are polyether polyols and more preferably polyoxyalkylene oxide polyols. Most preferred, triols are ethylene oxide-capped polyols prepared by reacting glycerin with propylene oxide, followed by reacting the product with ethylene oxide.

The prepolymer also comprises a dispersion triol having dispersed therein particles of an organic based polymer. Preferably the triol used to disperse the organic particles is a polyether triol and more preferably a polyoxyalkylene based triol. Preferably, such polyoxyalkylene oxide triol comprises a polyoxypropylene chain with a polyoxyethylene end cap. Such materials are well known in the art and initiators and alkylene oxides which may be used in the preparation of the triol are described hereinbefore. A particularly preferred polyether triol is a 1,2,3-propane triol initiated polyoxypropylene with a polyoxyethylene end cap. Preferably the triols used have a molecular weight of about 4,000 or greater, more preferably about 5,000 or greater and most preferably about 6,000 or greater. Preferably such triol has molecular weight of about 8,000 or less and more preferably about 7,000 or less. Below about 4,000 molecular weight the elongation and impact properties of the finally cured adhesive are too low for the intended use. Above about 8,000 molecular weight the adhesive prepared from the prepolymer is too elastomeric for the intended use. The triol preferably has a hydroxyl number which is high enough such that the adhesive prepared from the prepolymer cures rapidly enough and provides the desired open times. If the hydroxyl number is too low the adhesive cures too slowly and the desired open times and drive-away times cannot be achieved. The hydroxyl number should not be so high as to reduce the elongation of the cured adhesive prepared from the prepolymer. Preferably, the hydroxyl number of the triol is about 30 or greater and more preferably about 40 or greater. Preferably, the hydroxyl number of the triol is about 75 or less and more preferably about 60 or less.

Preferably the particles comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably the particles dispersed in the triol comprise copolymers of unsaturated nitriles, conjugated dienes and a monovinylidene aromatic monomer, a copolymer of an unsaturated nitrile and a monovinylidene aromatic monomer or a polyurea. Even more preferably the particles comprise a polyurea or polystyrene-acrylonitrile copolymer with the polystyrene-acrylonitrile copolymers being most preferred.

The organic polymer particles useful in this invention described hereinbefore are commonly available and well-known to those skilled in the art.

Representative monovinylidene aromatic compounds which can be employed herein include styrene, alkyl-substituted styrenes (e.g., alpha-methylstyrene and alpha-ethylstyrene) and ring-substituted styrenes (e.g., vinyl toluene, particularly para-vinyltoluene, ortho-ethylstyrene and 2,4-dimethylstyrene); ring-substituted halogenated styrenes such as chlorostyrene and 2,4-dichlorostyrene; styrenes substituted with both a halo and an alkyl group such as 2-chloro-4-methylstyrene and vinylanthracene. In general, the preferred monovinylidene aromatic compound(s) employed in preparing the styrenic polymer resin is styrene or a combination of styrene and alpha-methylstyrene (advantageously such combinations contain alpha-methylstyrene in amounts from about 10 to about 50, more advantageously from about 15 to 40, weight percent of the total weight of the styrene and alpha-methylstyrene); with styrene being the most preferred monovinylidene aromatic compound.

Conjugated dienes useful in the block copolymer include straight- and branched-chain aliphatic hydrocarbons containing two double bonds attached to adjacent carbon atoms. Preferred dienes contain 4 to 6 carbon atoms and include butadiene, isoprene, 1,3-pentadiene, 1,3-hexadiene, 2,3-dimethylbutadiene and mixtures thereof. More preferably, such conjugated dienes contain from about 4 to about 5 carbon atoms and include, for example, butadiene, isoprene, cis-1,3-pentadiene, trans-1,3-pentadiene and mixtures thereof. The most preferred dienes are butadiene and isoprene.

Preferred unsaturated nitrites useful herein include acrylonitrile, ethacrylonitrile, methacrylonitrile and mixtures thereof, more preferred is acrylonitrile. In preparing copolymers useful in this invention, the amount of the unsaturated nitrile(s) most advantageously employed will vary depending on the physical and chemical properties desired in the copolymer particles. The copolymer will advantageously be derived from about 5 to about 35, preferably from about 15 to about 25, weight percent of the unsaturated nitrile(s) wherein said weight percent is based on the total weight of the polymer.

To prepare the copolymers based on styrene and optionally other unsaturated compounds, mass or a combination of mass/suspension polymerization techniques are most commonly employed. Illustrative mass polymerization techniques are described in U.S. Pat. Nos. 2,727,884 and 4,782,127, which are incorporated herein by reference. Processes for the preparation of block copolymers of monovinylidene aromatic monomers and conjugated dienes are described in U.S. Pat. Nos. 5,242,984 and 5,134,968 both incorporated herein by reference.

The organic polymer particles dispersed in the triol preferably have a particle size which is large enough to improve the impact properties and elastomeric properties of the finally cured adhesive, but not so large so as to reduce the ultimate strength of the adhesive after cure. Preferably the particle size is about 10 microns or greater and more preferably the particle size is about 20 microns or greater. Preferably the particle size is about 50 microns or less and more preferably the particle size is about 40 microns or less. The triol dispersion contains a sufficient amount of organic polymer particles such that the adhesive upon cure has sufficient hardness for the desired use and not so much such that the cured adhesive has too much elasticity as defined by elongation. Preferably the dispersion contains about 20 percent by weight or greater of organic polymer particles copolymer based on the dispersion, preferably about 30 percent by weight or greater and more preferably about 35 percent by weight or greater. Preferably the dispersion contains about 60 percent by weight or less of organic polymer particles based on the dispersion, preferably about 50 percent by weight or less and more preferably about 45 percent by weight or less.

The polyols (diols and triols and dispersion triols) are present in an amount sufficient to react with most of the isocyanate groups of the isocyanates leaving enough isocyanate groups to correspond with the desired free isocyanate content of the prepolymer. Preferably the polyols are present in an amount of about 30 percent by weight or greater based on the prepolymer, more preferably about 40 percent by weight or greater and most preferably 55 percent by weight or greater. Preferably the polyols are present in an amount of about 75 percent by weight or less based on the prepolymer, more preferably about 65 percent by weight or less and most preferably 60 percent by weight or less. The weight ratio of diols to triols and dispersion triols is important to achieving the desired cure rate and strength of the adhesive.

If the weight ratio is too low the formulation is too viscous to handle and the resulting adhesive has insufficient elasticity to retain glass in an automobile window frame under crash conditions. If the ratio is too high the adhesive does not have adequate green strength. The weight ratio of diol to triol and dispersion triol is preferably about 0.8 or greater and more preferably 0.85 or greater and most preferably 0.9 or greater. The weight ratio of diol to triol and dispersion triol is about 1.2 or less; more preferably 1.0 or less and most preferably about 0.95 or less. In the embodiment where the polyols comprise a mixture of diols and triols the amount of diols present is preferably about 15 percent by weight or greater based on the prepolymer, more preferably about 25 percent by weight or greater and most preferably 28 percent by weight or greater; and about 40 percent by weight or less based on the prepolymer, more preferably about 35 percent by weight or less and most preferably 30 percent by weight or less. In the embodiment where the polyols comprise a mixture of diols and triols the amount of triols (non dispersion triol and dispersion triol) present is preferably about 15 percent by weight or greater based on the prepolymer, more preferably about 25 percent by weight or greater and most preferably 28 percent by weight or greater; and preferably about 45 percent by weight or less based on the prepolymer, more preferably about 35 percent by weight or less and most preferably 32 percent by weight or less.

The dispersion of organic polymer particles in a triol is present in the prepolymer in an amount of about 10 percent by weight or greater of the prepolymer and more preferably about 12 percent by weight or greater, and about 18 percent by weight or less of the prepolymer and more preferably about 15 percent by weight or less.

In one embodiment the thermoplastic polymer particles may be rubber-modified. Generally this involves blending an elastomeric or rubbery polymer with the thermoplastic polymer. A preferred rubbery material is acrylonitrile-butadiene-styrene interpolymer. Preferably, the rubber-modified thermoplastic polymer particles contain about 15 to about 25 percent by weight of rubber polymer particles.

In one embodiment the organic polymer particles comprise a polyurea, comprising the reaction product of a polyamine and a polyisocyanate. Preferably, the polyurea is prepared by the reaction of a polyamine, preferably a diamine, with a polyisocyanate, preferably a diisocyanate. The polyurea and polyamine are mixed and undergo immediate reaction at room temperature. Thereafter the polyurea is contacted with triols, preferably under high shear conditions to disperse the polyurea into the triol. Preferably the isocyanate used to prepare the polyurea is a cycloaliphatic or aliphatic polyisocyanate, as the use of cycloaliphatic and aliphatic isocyanates facilitate handling and stability of the polyurea. Preferably the polyurea has a urea functionality of about 8 percent or greater, more preferably about 10 percent or greater and most preferably about 15 percent or greater. Preferably the polyurea has a functionality of about 40 percent or less and more preferably about 20 percent or less. Functionality as used herein relative to polyureas refers to weight percent of urea groups present in the polyurea.

The polyurethane prepolymers of the invention may further comprise a plasticizer. The plasticizers useful in the prepolymer are common plasticizers useful in polyurethane adhesive applications and well known to those skilled in the art. The plasticizer is present in an amount sufficient to disperse the prepolymer in the final adhesive composition. The plasticizer can be added to the adhesive either during preparation of the prepolymer or during compounding of the adhesive composition. Preferably the plasticizer is present in about 1 percent by weight or greater of the prepolymer formulation (prepolymer plus plasticizer), more preferably about 20 percent by weight or greater and most preferably about 30 percent by weight or greater. Preferably the plasticizer is present in about 45 percent by weight or less of the prepolymer formulation and more preferably about 35 percent by weight or less.

The polyurethane prepolymer may be prepared by any suitable method, such as bulk polymerization and solution polymerization. Preferable processes for the preparation of the prepolymers are disclosed in U.S. Pat. No. 5,922,809 at column 9, line 4 to 5 incorporated herein by reference. The polyurethane prepolymers are present in the adhesive composition in an amount sufficient such that when the resulting adhesive cures substrates are bound together. Preferably the lap shear strengths of bonds so formed is about 150 psi (206 kPa) or greater after about 2 hours. Preferably the polyurethane prepolymers are present in an amount of about 55 parts by weight of the adhesive composition or greater, more preferably about 60 parts by weight or greater and most preferably about 66 parts by weight or greater. Preferably the polyurethane prepolymers are present in an amount of about 80 parts by weight of the adhesive composition or less, more preferably about 75 parts by weight or less and even more preferably about 68 parts by weight or less.

The adhesive of the invention may be formulated with fillers and additives known in the prior art for use in adhesive compositions. By the addition of such materials physical properties such as viscosity flow rates and the like can be modified. However, to prevent premature hydrolysis of the moisture sensitive groups of the polyurethane prepolymer, fillers should be thoroughly dried before admixture therewith.

Optional components of the adhesive of the invention include reinforcing fillers. Such fillers are well known to those skilled in the art and include carbon black, titanium dioxide, calcium carbonate, surface treated silicas, titanium oxide, fume silica, talc, and the like Preferred reinforcing fillers comprise carbon black. In one embodiment, more than one reinforcing filler may be used, of which one is carbon black and a sufficient amount of carbon black is used to provide the desired black color to the adhesive. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 20 parts by weight or greater and most preferably about 24 parts by weight or greater. Preferably the reinforcing filler is present in an amount of about 40 parts by weight of the adhesive composition or less, more preferably about 32 parts by weight or less and most preferably about 28 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray-dried beads or finely ground particles. Clays may be used in an amount of 0 parts by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of the invention may further comprise a catalyst known for promoting the cure of polyurethanes in the presence of moisture. Preferable catalysts include. metal salts such as tin carboxylates, organo silicon titanates, alkyl titanates, metal carboxylates, and dimorpholinodiethyl ether or alkyl-substituted dimorpholinodiethyl ethers. Preferably the catalyst comprises a mixture of metal carboxylates and one of a dimorpholino-diethyl ether or an alkyl substituted dimorpholino diethyl ether. Preferred metal carboxylates include bismuth carboxylates. Among preferred catalysts are bismuth octoate, dimorpholinodiethyl ether and (di-(2-(3,5-dimethylmorpholino)ethyl))ether. Such catalysts, when employed are preferably employed in an amount based on the weight of the adhesive composition of about 0 parts by weight or greater, more preferably about 0.1 parts by weight or greater, even more preferably about 0.2 parts by weight or greater and most preferably about 0.4 parts by weight or greater. Such catalysts are preferably employed in an amount, based on the weight of the adhesive composition of about 5 parts by weight or less, more preferably about 1.75 parts by weight or less, even more preferably about 1 part by weight or less and most preferably about 0.6 parts by weight or less.

The adhesive composition of this invention may further comprise plasticizers so as to modify the Theological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably plasticizers are used in the adhesive composition in an amount of about 0 parts by weight or greater based on the weight of the adhesive composition, more preferably about 5 parts by weight or greater and most preferably about 10 parts by weight or greater. The plasticizer is preferably used in an amount of about 45 parts by weight or less based on the total amount of the adhesive composition and more preferably about 40 parts by weight or less.

The adhesive of this invention may further comprise stabilizers which function to protect the adhesive composition from moisture, thereby inhibiting advancement and preventing premature crosslinking of the isocyanates in the adhesive formulation. Included among such stabilizers are diethylmalonate and alkylphenol alkylates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The adhesive composition may further comprise a hydrophilic material which functions to draw atmospheric moisture into the composition. This material enhances the cure speed of the formulation by drawing atmospheric moisture to the composition. Preferably the hydrophilic material is a liquid. Among preferred hydroscopic materials are pyrolidinones such as 1 methyl-2-pyrolidinone, available from under the trademark m-pyrol. The hydrophilic material is preferably present in an amount of about 0.1 percent by weight or greater and more preferably about 0.3 percent by weight or greater and preferably about 1.0 percent by weight or less and most preferably about 0.6 percent by weight or less. Optionally the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties. Preferably the thixotrope is present in an amount of about 0 parts by weight or greater based on the weight of the adhesive composition, preferably about 1 part by weight or greater. Preferably the optional thixotrope is present in an amount of about 10 parts by weight or less based on the weight of the adhesive composition and more preferably about 2 parts by weight or less.

Other components commonly used in adhesive compositions may be used in the adhesive composition of this invention. Such materials are well known to those skilled in the art and may include ultraviolet stabilizers and antioxidants and the like.

As used herein all parts by weight relative to the components of the adhesive composition are based on 100 total parts by weight of the adhesive composition.

The adhesive composition of this invention may be formulated by blending the components together using means well-known in the art. Generally the components are blended in a suitable mixer. Such blending is preferably conducted in an inert atmosphere in the absence of oxygen and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example U.S. Pat. Nos. 4,525,511, 3,707,521 and 3,779,794, relevant parts of all are incorporated herein by reference. Generally the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably the adhesive of the invention is formulated to provide a working time of about 6 minutes or greater more preferably about 10 minutes or greater. Preferably the working time is about 15 minutes or less and more preferably about 12 minutes or less.

The adhesive composition is preferably used to bond glass to other substrates such as metal or plastics. In a preferred embodiment the first substrate is a glass window and the second substrate is a window frame. In another preferred embodiment the first substrate is a glass window and the second substrate is a window frame of an automobile. Preferably the glass window is cleaned and has a glass primer applied to the area to which the adhesive is to be bonded.

Preferably the adhesive compositions of the invention demonstrate a lap shear strength after 2 hours from application to substrates of about 150 psi (1033 kPa). Lap shears are determined according to ASTM D-3163. Preferably the cured adhesive compositions of the invention demonstrate an elongation of 300 percent or greater as determined according ASTM D-638-91 and preferably greater than about 600 percent. Preferably the elongation is 700 percent or less.

Viscosities as described herein are determined according to the following procedure: measured using the Brookfield Viscometer, Model RVT at standard conditions of 72° F. (22° C.) and 50 percent RH. The viscometer is calibrated using silicone oils of known viscosities, which vary between 5,000 cps to 50,000 cps. A set of RV spindles that attach to the viscometer are used for the calibration. All measurements are done using the No. 5 spindle at a speed of 5 revolution per second for 5 minutes until the viscometer equilibrates. The viscosity corresponding to the equilibrium reading is then calculated using the calibration.

Molecular weights as described herein are determined according to the following procedure: determined using the Waters Model 590 Gel Permeation Chromatograph. This unit is connected to a multiwavelength detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

In reference to polyurethane prepolymers, average isocyanate functionality is determined according to the following formula, moles diol-NCO adduct×diol-NCO functionality+moles triol-NCO adduct×triol-NCO functionality+moles excess polyisocyanate monomer×its functionality moles diol-NCO adduct+moles triol-NCO adduct+moles excess polyisocyanate monomer wherein moles excess polyisocyanate monomer are calculated according to the following formula, moles of isocyanate−(2×moles of diol+3×moles of triol)

and the moles of isocyanate, diol and triol are based on the amount of each in the starting formulation.

The theoretical average molecular weight of the prepolymer is calculated as equal to the average isocyanate functionality times the isocyanate equivalent weight of the prepolymer.

Functionality of the raw material is generally disclosed by the raw material supplier. It can be determined empirically by means of titrating the polyol or isocyanate to determine the average number functional group per molecule. One skilled in the art knows how to determine the functionality based on data developed by titration.

Illustrative Embodiments of the Invention

The following examples are provided to illustrate the invention, but are not intended to limit the scope thereof. All parts and percentages are by weight unless otherwise indicated.

EXAMPLE 1

Preparation of Prepolymer

A polyether polyurethane prepolymer was prepared by mixing 980 g of a polyoxypropylene diol having an average molecular weight of 2,000 with 595 g of a polyoxypropylene triol having an average molecular weight of 4,500 and 455 g of a styrene acrylonitrile dispersed polyoxypropylene triol with an average molecular weight of 5,400. Mixing was carried out in a reactor by heating the mixture to 48° C. 320 g of diphenylmethane-4,4'-diisocyanate and 0.17 g of stannous octoate was added to the mixture. The whole mixture was then reacted for one hour. Finally, 1120 g of a plasticizing agent dialkyl phthalate was added to the mixture and the mixing was continued for one hour. The diol to triol and dispersion triol ratio was 0.93.

EXAMPLE 2

Preparation of Adhesive Composition

An adhesive composition was prepared under anhydrous conditions using1070 g of prepolymer of this Example 1 in a planetary mixer, and degassed for 20 minutes, to the prepolymer, 408 g of carbon black and 106 g of clay were added. The composition was mixed for 20 minutes under vacuum. Finally 7.2 g of dimorpholinodiethyl ether (DMDEE)4 g of bismuth octoate (BiO) and 4.8 grams of m pyrol, 1-methyl-2-pyrolidinone were added to the mixture. The mixture was mixed for another 20 minutes and packaged in tubes.

EXAMPLE 3

A prepolymer was prepared using the procedure and ingredients of Example 1 except the following amounts were used; 1050 g of diol; 717.5 g of triol, 525 g of dispersion triol and 381.5 g of methylene diphenyl isocyanate, 0.17 g of catalyst and 791 g of plasticizer. The diol to triol and dispersion triol ratio was 0.85. an adhesive was prepared according to the process of Example 2 using 1070 g of prepolymer, 408 g of carbon black and 106 g of clay, 8 g of DMDEE, 4 g of bismuth octoate and 4.8 g of m-pyrol.

EXAMPLE 4

Comparative Example

A prepolymer was prepared using the components described in Example 1 in the following percentages by weight, diol, 21 percent, triol, 30.21 percent, dispersion triol 13.7 percent; MDI 12 percent, plasticizer 22.088 percent, and catalyst 0.002 percent. The composition also included 1 percent of diethyl malonate. The adhesive composition was compounded as Example 2.

EXAMPLES 5 TO 9

In Examples 5 to 9 to ingredients described in Examples 1 and 2 were used to prepare prepolymers and adhesives. The amounts of the ingredients used in the prepolymers are listed in Table 1 along with properties of the prepolymers.

TABLE 1

| | Examples | | | | |
|---|---|---|---|---|---|
| Prepolymer Ingredient | 5 | 6 | 7 | 8 | 9 |
| Isocyanate | 9 | 8.2 | 13 | 9 | 9 |
| Diol | 28 | 28 | 28 | 27 | 31 |
| Triol | 17 | 17 | 17 | 22 | 13 |
| Dispersion triol | 13 | 13 | 13 | 13 | 13 |
| Plasticizer | 32 | 32.8 | 28 | 28 | 33 |
| Catalyst | 5 drops | 5 drops | 5 drops | 5 drops | 5 drops |
| Stabilizer[1] | 1 | 1 | 1 | 1 | 1 |
| Total | 100 | 100 | 100 | 100 | 100 |
| Diol/triol ratio (wt) | 0.93 | 0.93 | 0.93 | 0.77 | 1.19 |
| Primary NCO%[2] | 0.983 | 0.65 | 2.206 | 0.764 | 0.935 |
| Secondary NCO%[3] | 0.933 | n/a | 2.142 | 0.72 | 0.823 |
| Viscosity (cps)[4] | 36240 | 220000 | 6080 | 127000 | 35280 |
| (cm$^2$/s) | (362.6) | (2201) | (60.83) | (1271) | 353.0 |
| Spindle | s5 | semi-gel/s7[7] | s5 | s6 | S5 |
| Heat Aged NCO%[5] | 0.941 | | 2.001 | n/a | 0.77 |

TABLE 1-continued

|  | Examples | | | | |
| --- | --- | --- | --- | --- | --- |
| Prepolymer Ingredient | 5 | 6 | 7 | 8 | 9 |
| Heat Aged Viscosity[6] (cps)/(cm²/s) | 46400 (464.2) | | 6080 (60.83) | 220000 | 45200 (452.2) |
| Spindle | 5 | | 5 | Semi-gel/s7[7] | 5 |
| Percent Viscosity Growth | 28 | | 0 | | 28 |

[1]Diethyl Malonate
[2]Viscosity shortly after preparation of the prepolymer at 25° C.
[3]Viscosity 24 hours after prepolymer preparation.
[4]Viscosity 24 hours after prepolymer preparation.
[5]Heat aged NCO percentage is measured after 3 days of heating at 54° C.
[6]Heat aged viscosity is measured after heating for 3 days at 54° C., viscosity is measured at 25° C.
[7]The prepolymer had gelled to a point that viscosity could not be measured.

Cure Rate Testing

Each of the adhesives prepared were tested for cure rate according to the following test. A bead of adhesive 6.35 mm (width)×6.35 mm (height)×25.4 mm (length) size bead was placed on 25.4 mm×101.6 mm piece of primed glass and a metal coupon and allowed to cure for 2 hours at 23° C., 50 percent humidity. Cure rate was determined by pulling the lap-shear samples by Instron using 2 inches per minute speed. Load and extension were recorded in pounds and inches respectively. The results are recorded in Table 2.

TABLE 2

| Example | Lap Shear Strength after 2 hours psi | (Kpa) | Lap Shear Extension after 2 hours (in) | (cm) | Diol/Triol |
| --- | --- | --- | --- | --- | --- |
| 2 | 167 | (1150) | .85 | 2.2 | .93 |
| 3 | 157 | (1082) | .83 | 2.1 | .85 |

TABLE 2-continued

| Example | Lap Shear Strength after 2 hours psi | (Kpa) | Lap Shear Extension after 2 hours (in) | (cm) | Diol/Triol |
| --- | --- | --- | --- | --- | --- |
| 4 | 97 | (668) | .36 | .91 | .48 |
| 9 | 125 | (862) | .82 | 2.1 | 1.1* |

*The tackfree time was too short about 3 minutes.

The adhesives of Examples 5 and 7 to 9 were tested in the press flow test, and working time test described below and for cure rate and extension as described above. All tests were performed in triplicate and results are the average of the three actual tests. The press flow is the time it takes for 20 g of adhesive to pass through a 0.203 in. (5.16 mm) orifice at 80 psi (552 kPa) pressure.

The tack free time test was performed according to ASTM D2377-84. The results are compiled in Table III.

TABLE 3

| Examples | | 5 | 7 | 8 | 9 |
| --- | --- | --- | --- | --- | --- |
| Press flow (sec.)[8] | | 39 | 14 | 116 | 41 |
| Tack Free Time (min.)[9] | | 6 | 13 | 1 | 3 |
| Cure Rate[10] | | Psi (kPa) | Psi (kPa) | Psi (kPa) | Psi (kPa) |
| 1 hour | Run 1 | 72 (496) | 16.8 (116) | 98.8 (681) | 72.4 (499) |
|  | Run 2 | 71.6 (494) | 18.8 (130) | 117.2 (808.0) | 69.6 (480) |
|  | Run 3 | 60 (414) | 17.6 (121) | 104 (717) | 63.2 (436) |
|  | Avg | 67.8 (467) | 17.7 (122) | 107 (738) | 68.4 (472) |
| 2 hours | Run 1 | 235.5 (1624) | 64.1 (442) | 182 (1255) | 134.4 (927) |
|  | Run 2 | 169.5 (1169) | 66.2 (456) | 225.7 (1556) | 121.1 (835) |
|  | Run 3 | 233.8 (1612) | 74.5 (514) | 187.2 (1291) | 120.3 (829) |
|  | Avg | 212.9 (1468) | 68.2 (470) | 198.3 (1367) | 125.3 (864) |
| Extension | | in/cm | in/cm | in/cm | in/cm |
| 1 hour | Run 1 | 0.703 (1.79) | 0.280 (.711) | 0.845 (2.15) | 0.830 2.11 |
|  | Run 2 | 0.721 (1.83) | 0.515 (1.31) | 0.715 (1.82) | 0.823 2.09 |
|  | Run 3 | 0.765 (1.94) | 0.362 (.919) | 0.863 (2.19) | 0.811 2.06 |
|  | Avg | .730 (1.85) | .386 (.980) | .808 (2.05) | .821 (2.09) |
| 2 hours | Run 1 | 0.908 (2.31) | 0.55 (1.40) | 0.765 (1.94) | 0.866 (2.20) |
|  | Run 2 | 0.851 (2.16) | 0.359 (.911) | 0.846(2.15) | 0.794 (2.02) |

TABLE 3-continued

| | | | | |
|---|---|---|---|---|
| Run 3 | 0.784 (1.99) | 0.694 (1.76) | 0.753 (1.91) | 0.814 (2.07) |
| Avg | .847 (2.15) | .535 (1.36) | .788 (2.00) | .825 (2.10) |

[8]at 24° C.
[9]At 25.7° C. and 58% Relative Humidity.
[10]At 23° C. and 50% Relative Humidity.

What is claimed is:

1. A polyurethane prepolymer comprising the reaction product of:
    A) one or more polyisocyanates;
    B) a mixture of one or more diols and one or more triols;
    C) a dispersion triol containing from about 10 to about 60 percent by weight based on the dispersion of organic polymer particles having a particle size of from about 10 to about 50 microns;
    wherein the prepolymer has a free isocyanate content of from about 0.8 to about 2.2 percent, the weight ratio of diol to triol and dispersion triol is from about 0.8 to about 1.2.

2. A prepolymer according to claim 1 wherein the triol in the dispersion triol has a molecular weight of about 4,000 to about 8,000 and a hydroxyl number of from about 30 to about 70.

3. A prepolymer according to claim 2 wherein the prepolymer has a Brookfield viscosity using Spindle No. 5 of from about 30,000 to about 100,000 centipoise.

4. A prepolymer according to claim 3 wherein the isocyanate content is from about 0.8 to about 1.1 percent by weight.

5. A polyurethane prepolymer according to claim 1 which comprises:
    A) i. the reaction product of from about 5 to about 20 percent by weight of a polyisocyanate;
    B) ii) from about 20 to about 40 percent by weight of a diol,
        iii) from about 15 to about 35 percent by weight of a triol;
        iv) from about 10 to about 30 percent by weight of a dispersion triol; and
    B) from about 1 to about 40 percent by weight of a plasticizer.

6. A one-part adhesive composition comprising a polyurethane prepolymer according to claim 1 and a catalyst capable of catalyzing the reaction of isocyanate moieties with water.

7. An adhesive according to claim 6 wherein the triol in the dispersion triol has a molecular weight of about 4,000 to about 8,000 and a hydroxyl number of from about 30 to about 70.

8. An adhesive according to claim 7 wherein the prepolymer has a Brookfield viscosity using Spindle No. 5 of from about 30,000 to about 100,000 centipoise.

9. A one-part adhesive according to claim 8 comprising:
    1) from about 55 to about 80 parts by weight of prepolymer;
    2) from about 15 to about 40 parts by weight of a reinforcing filler;
    3) from about 1 to about 20 parts by weight of clay;
    4) from about 0.1 to about 5.0 parts by weight of a catalyst
    5) from about 5 to about 45 parts by weight of plasticizer;
    wherein the adhesive contains 100 parts.

10. An adhesive according to claim 9 wherein the catalyst comprises a mixture of a dimorpholino diethyl ether or an alkyl substituted dimorpholino diethyl ether and a bismuth carboxylate.

11. An adhesive according to claim 9 wherein the prepolymer comprises:
    A) i. the reaction product of from about 5 to about 20 percent by weight of a polyisocyanate:
    B) ii) from about 20 to about 40 percent by weight of a diol,
        iii) from about 15 to about 35 percent by weight of a triol;
        iv) from about 10 to about 30 percent by weight of a dispersion triol; and
    B) from about 1 to about 40 percent by weight of a plasticizer.

12. An adhesive according to claim 6 wherein the prepolymer has an isocyanate content of from about 0.8 to about 1.1 percent by weight.

13. A method of bonding two substrates together comprising contacting the two substrates with an adhesive according to claim 6 disposed between the substrates and curing the adhesive composition.

14. The method of claim 13 wherein the substrate is glass, metal, plastic, a composite, wood or a coated surface.

15. The method of claim 14 wherein one substrate is glass and the other is a coated surface.

16. The method of claim 15 wherein the glass is window glass for an automobile and the coated surface is the part of the automobile adapted to hold the window glass in place.

17. A method according to claim 13 wherein the adhesive comprises:
    1) from about 55 to about 80 parts by weight of prepolymer;
    2) from about 15 to about 40 parts by weight of a reinforcing filler;
    3) from about 1 to about 20 parts by weight of clay;
    4) from about 0.1 to about 5.0 parts weight of a catalyst
    5) from about 5 to about 45 parts by weight of plasticizer;
    wherein the adhesive contains 100 parts.

18. A method according to claim 17 wherein the prepolymer in the adhesive has a Brookfield viscosity using Spindle No. 5 of from about 30,000 to about 100,000 centipoise.

19. A method according to claim 17 wherein the catalyst in the adhesive comprises a mixture of a dimorpholino diethyl ether or an alkyl substituted dimorpholino diethyl ether and a bismuth carboxylate.

20. A method according to claim 17 wherein the triol in the dispersion triol in the adhesive has a molecular weight of about 4,000 to about 8,000 and a hydroxyl number of from about 30 to about 70.

* * * * *